United States Patent
Liu et al.

(10) Patent No.: US 7,772,821 B2
(45) Date of Patent: Aug. 10, 2010

(54) DIGITAL CURRENT SHARE BUS INTERFACE

(75) Inventors: Chao Liu, San Jose, CA (US); Anthonius Bakker, Morgan Hill, CA (US)

(73) Assignee: Analog Devices, Inc., Norwood, MA (US)

( * ) Notice: Subject to any disclaimer, the term of this patent is extended or adjusted under 35 U.S.C. 154(b) by 660 days.

(21) Appl. No.: 11/818,093

(22) Filed: Jun. 12, 2007

(65) Prior Publication Data

US 2008/0309300 A1 Dec. 18, 2008

(51) Int. Cl.
*G05F 1/00* (2006.01)

(52) U.S. Cl. ...................................... 323/283

(58) Field of Classification Search ................. 323/265, 323/266, 268, 269, 271, 282, 283, 285
See application file for complete search history.

(56) References Cited

U.S. PATENT DOCUMENTS

| | | | | |
|---|---|---|---|---|
| 6,563,294 B2 * | 5/2003 | Duffy et al. | ................. | 323/283 |
| 6,788,036 B1 | 9/2004 | Milavec et al. | ............... | 323/272 |
| 6,795,009 B2 * | 9/2004 | Duffy et al. | ................. | 323/283 |
| 7,007,176 B2 * | 2/2006 | Goodfellow et al. | ........ | 323/283 |
| 7,235,957 B2 * | 6/2007 | Yang | ........................... | 323/284 |
| 7,249,267 B2 * | 7/2007 | Chapuis | ...................... | 323/283 |

OTHER PUBLICATIONS

Analog Devices; "Secondary-Side Controller With Current Share and Housekeeping"; ADM 1041; Rev. A; pp. 1-64, 2004.

* cited by examiner

*Primary Examiner*—Bao Q Vu
*Assistant Examiner*—Jue Zhang
(74) *Attorney, Agent, or Firm*—Koppel, Patrick, Heybl & Dawson

(57) ABSTRACT

A digital current share bus interface connects to a power module which provides a signal representative of its output current, and adjusts the module's output current in response to a control signal received from the interface. A data formatting module receives the output current signal and generates a digital word that varies with the current; the bits of the word are coupled to a current share bus. A comparator module receives digital words conveyed via the bus and generated by the data formatting module at respective inputs, and provides the control signal to the power module so as to adjust its output current to match the current value represented by the digital word on the bus. In a typical implementation, multiple power modules are coupled to the current share bus via respective interfaces, with the output currents of all the power modules connected in parallel.

22 Claims, 6 Drawing Sheets

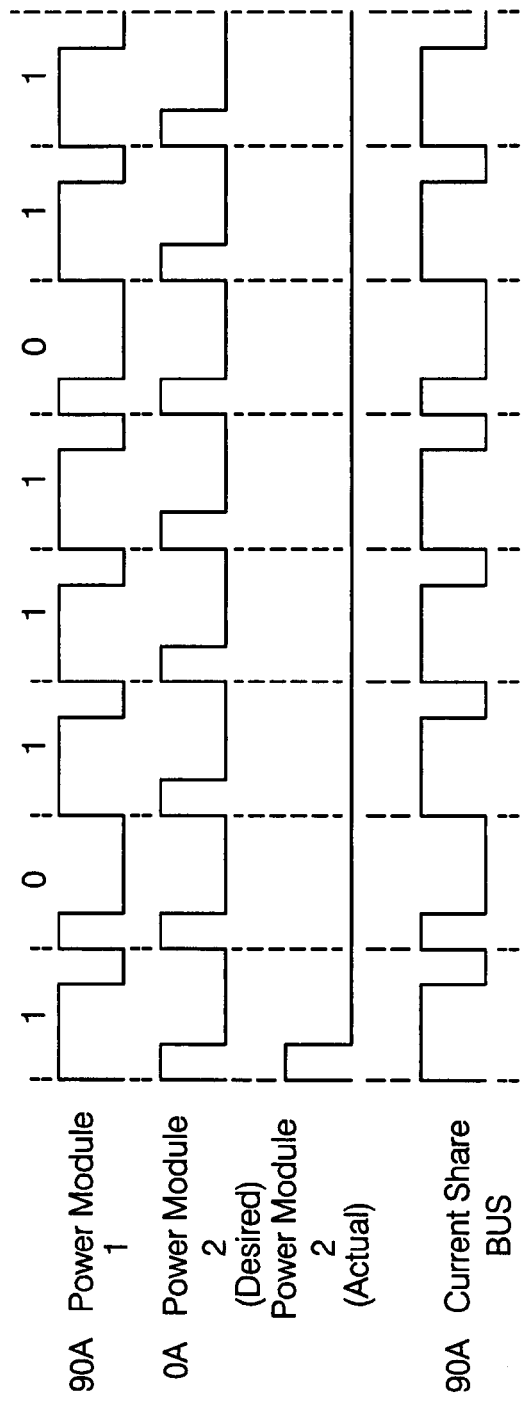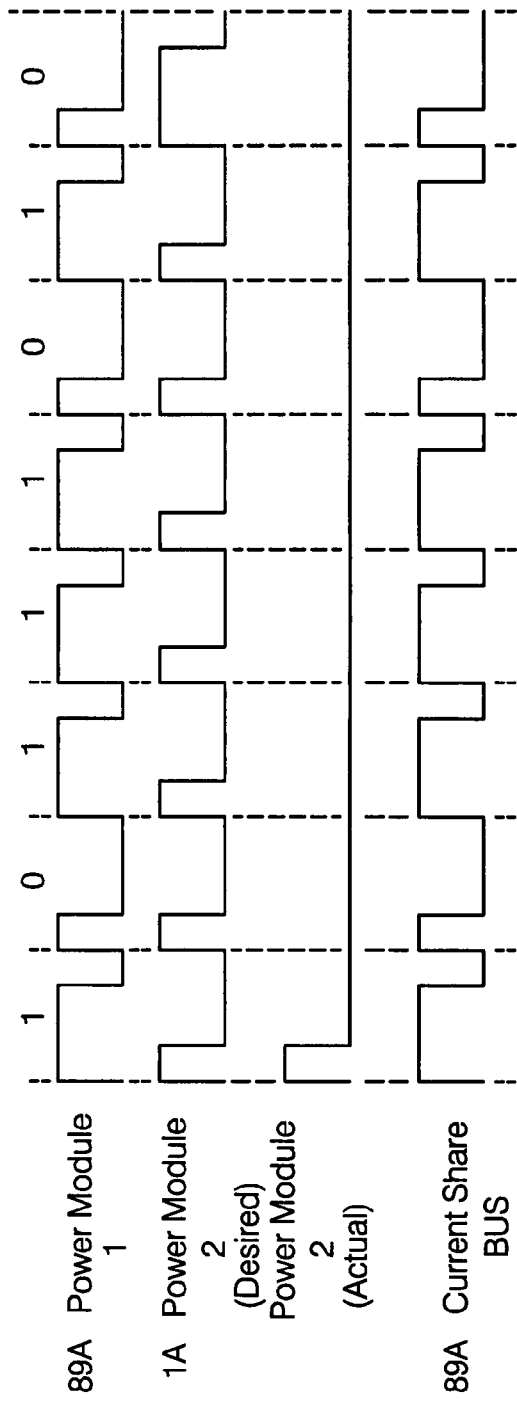

DIGITAL CURRENT SHARE BUS INTERFACE

BACKGROUND OF THE INVENTION

1. Field of the Invention

This invention relates generally to the field of current share busses designed to enable a load current to be shared equally between multiple power modules, and more particularly to a digital implementation of an interface for such a bus.

2. Description of the Related Art

It is often advantageous to implement a power system using a plurality of individual DC-to-DC or AC-to-DC power modules or supplies connected in parallel. ("Power module" in this context refers to a voltage/current converter, not to the ultimate source of electric current such as a battery or generator). Unlike a single module power source, a multi-module power system can provide for failure recovery if one module ceases to operate. Furthermore, simply supplementing the design with additional power modules may increase the total current capacity of a multi-module system. Often such power systems are used in telecommunications equipment and other equipment requiring a reliable source of power, e.g., matrix switches and industrial controllers.

The total current delivered to a load from a power system having multiple power modules configured in parallel equals the sum of the currents delivered by each individual module. If one module delivers a greater amount of current, that module will dissipate more power and therefore become hotter than the other modules. Higher operating temperature normally yields reduced reliability of the overall power system. Therefore, it is preferable that the total load current be evenly distributed among the parallel-connected power modules.

FIG. 1a illustrates a power system 10 using multiple power modules 12, 14, 16, 18 configured in parallel supplying power to a load 19 connected to an output node 20. Each module accepts an input voltage VDD and provides an output current $I_0$, $I_1$, $I_2$, $I_3$ to output node 20. If the current supplied by the power system is evenly divided among the power modules, each module will deliver an equal amount of power, and no one module will be driven to an extreme that may cause power conversion inefficiencies, power module degradation or premature power module failure.

To evenly distribute the power load, an external controller may be used to sense and adjust each module's current output. Alternatively, the power modules may be designed to communicate among each other and self-regulate their output power. For example, a power system may be designed such that each module communicates its output current to other power modules and each module adjusts its output based on the received signal. One way in which this communication may be effected is with the use of a "current share bus" 22. Here, each power module is connected to the share bus which may be, for example, a single wire providing an analog voltage signal relative to a common ground of power system 10. In operation, each power module attempts to raise the voltage on bus 22 to a value indicative of the current supplied by that power module. The power module providing the greatest current to the load overrides the voltage provided by the other power modules. The voltage level on the shared bus therefore corresponds to a level indicating the current supplied by the power module providing the most current.

As well as providing a voltage indicative of a power module's output current, each power module also monitors current share bus 22 to determine the maximum current supplied by any one of the other power modules. If each power module is providing the same amount of current to the load, the voltage applied to the bus by each module is equal to the voltage monitored by each module from the bus. Any power module providing a level of current below that which is indicated on the bus will detect that at least one module is providing more current, and is arranged to incrementally increase its output voltage until its output current equals the current indicated on the bus. In this way, each of the modules will increase its output current in an attempt to track the output current supplied by the module providing the most current.

FIG. 1b is a simplified schematic showing one means by which a power module (12) could be interfaced to a single-wire current share bus (22) that carries a shared analog signal representing an averaged signal; an example of this approach is found in the ADM1041 Secondary-Side Controller with Current Share and Housekeeping IC from Analog Devices, Inc. An analog current sense signal 26 received from module 12 represents the sensed current. Signal 26 is coupled to an error amplifier 30, the output of which (31) drives the share bus; a diode 32 connected in series with output 31 ensures that the error amplifier can only increase the voltage on the bus.

The voltage on bus 22 is coupled to the bottom side of an offset voltage 36, the top side of which is connected to amplifier 30. Offset voltage 36 ensures that when the power module is a "slave" device—i.e., a power module which is not outputting the highest output current— its current sense information is always less than that associated with the "master" power module; without such an offset, there may be no clear "master", and the system may be prone to "hunting" for one. The voltage on bus 22 is coupled to power module 12, which causes its output current to adjust as needed to make it approximately equal to that of the master module.

Another approach is described in U.S. Pat. No. 6,788,036 to Milavec et al. Here, a power module's interface circuitry puts a pulse-width modulated (PWM) signal onto the current share bus, with the pulse width being proportional to the current sense value.

SUMMARY OF THE INVENTION

A digital current share bus interface is presented in which current sense data is conveyed digitally over the current share bus, using a single wire communication protocol.

A power module, typically one of several having their outputs connected in parallel, is arranged to provide an output signal (preferably a digital signal) representative of its output current, and to adjust its output current in response to a signal received at a control input. The present interface includes a digital controller which comprises a data formatting module and a comparator module. The data formatting module receives the output signal representative of the power module's output current and generates a digital word which varies with the output current; the bits of the digital word are coupled to a current share bus. The data formatting module is preferably arranged such that a clock for the bus is modulated onto the data conveyed on the bus.

The comparator module receives digital words conveyed via the bus and generated by the data formatting module at respective inputs, and provides the control signal to the power module so as to adjust its output current to match the current value represented by the digital word on the bus.

In a typical implementation, multiple power modules are coupled to the current share bus via respective interfaces, with the output currents of all the power modules connected in parallel. The interfaces are arranged such that the digital word on the share bus represents the value of the output current provided by the power module providing the highest output current. Note that data other than that related to output currents could also be shared between power modules via a current share bus system as described herein.

These and other features, aspects, and advantages of the present invention will become better understood with reference to the following drawings, description, and claims.

BRIEF DESCRIPTION OF THE DRAWINGS

FIG. 1b is block/schematic diagram of a known interface circuit for a power system such as that shown in FIG. 1a.

FIGS. 7a-7d are timing diagrams illustrating the operation of a digital current share bus interface per the present invention.

DETAILED DESCRIPTION OF THE INVENTION

Figure 2:
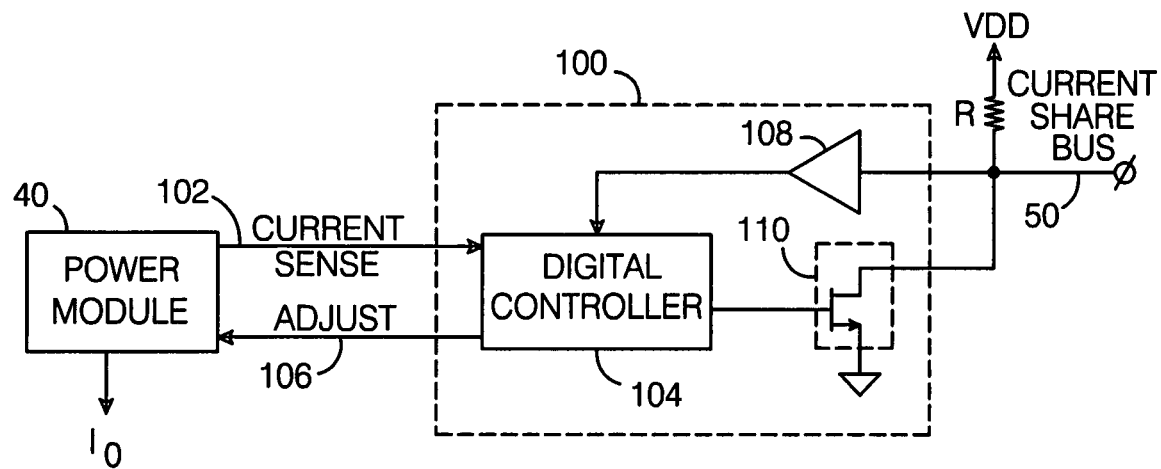
FIG. 2 is a block/schematic diagram of a digital current share bus interface per the present invention.

A diagram illustrating the principles of a digital current share bus interface 100 per the present invention is shown in FIG. 2. The interface operates between a power module 40 and a digital current share bus 50. In operation, interface 100 receives current sense information 102 which represents the output current ($I_O$) of power module 40 and conveys it to share bus 50, receives output current information being conveyed via bus 50, and causes the output current of power module 40 to be adjusted as necessary to make it approximately equal to the output current value on the bus. In a typical application, there are multiple power modules like module 40 having their output currents connected in parallel, and multiple interfaces 100 coupling respective power modules to current share bus 50.

Note that for purposes of illustration, only the sharing of output current information via a share bus is described herein. However, data other than that related to output currents could also be shared between power modules via a current share bus system as described herein.

Interface 100 is a digital interface. Current sense information 102 is handled as a digital word, and information is conveyed to other interfaces via current share bus 50 digitally. Interface 100 includes a digital controller 104 which receives current sense information 102 and provides the control signal 106 needed to adjust the power module's output current. The interface would also typically include a buffer 108 which receives data from current share bus 50 and conveys it to controller 104, and a bus driver 110 which conveys digital data from the controller to the bus.

Bus driver 110 is suitably an NMOS FET as shown in FIG. 2, though many other device types or circuits could be used to provide this function. In this exemplary embodiment, current share bus 50 is pulled up to VDD via a resistor R; bus driver 110 must be capable of pulling the bus voltage down to a 'low' logic level.

Current sense information is processed digitally and conveyed on bus 50 digitally. In this way, bus 50 is made insensitive to ground noise that might adversely affect an analog current share bus. In addition, the present interface does not require a voltage offset as found in the prior art, and eliminates stability issues found in some earlier designs.

Figure 3:
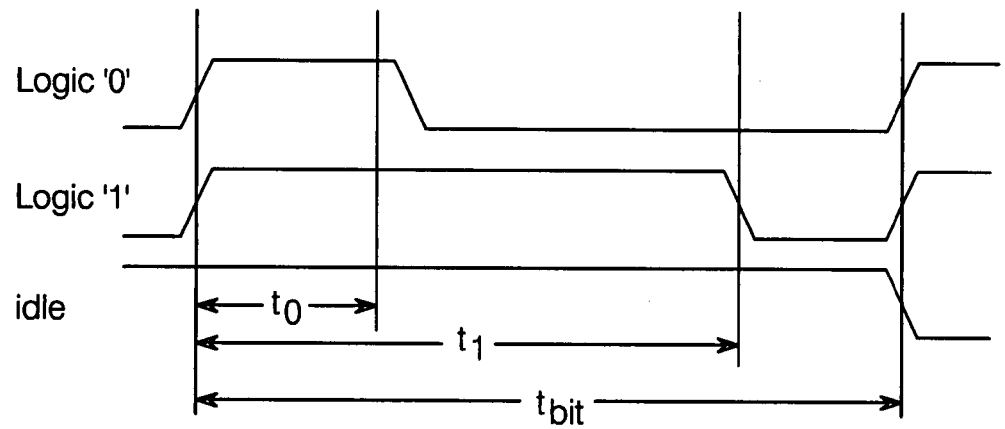
FIG. 3 is timing diagram illustrating one possible set of the definitions for '1' and '0' logic levels for a digital current share bus interface per the present invention.

The present digital current share interface preferably defines logic '1' and logic '0' as shown in FIG. 3. Note that FIG. 3 illustrates a data bit as delivered to the gate of NMOS FET 110; the actual signal on the bus is inverted from that shown in FIG. 3, because of the inversion by the open drain NMOS FET. As previously noted, data is conveyed on the current share bus digitally, as a sequence of bits. Each data bit has a duration of $t_{bit}$. A logic '0' is defined as a low-to-high transition at the start of the bit, and a high-to-low transition at approximately 25% of $t_{bit}$. A logic '1' is defined as a low-to-high transition at the start of the bit, and a high-to-low transition at approximately 75% of $t_{bit}$. When idle, the signal is '0' at the gate of the NMOS FET, and the bus will be pulled up to approximately VDD via pull-up resistor R. Note that FIG. 3 depicts only one possible set of definitions for the logic levels, which could be defined in a many different ways.

Figure 4:
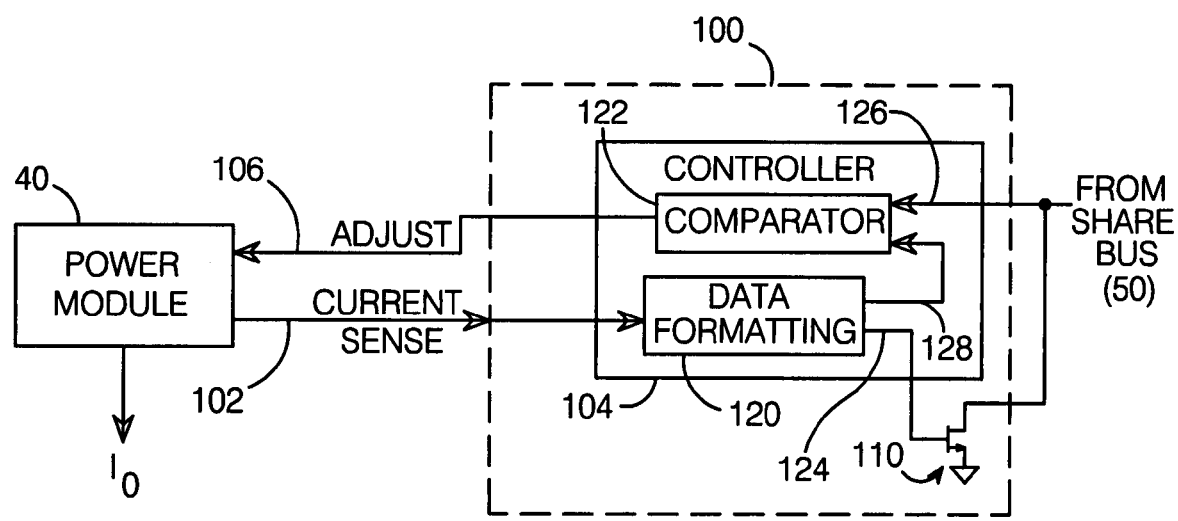
FIG. 4 is block/schematic diagram of a digital controller as might be used in a digital current share bus interface per the present invention.

As shown in FIG. 4, digital controller 104 preferably includes a data formatting module 120 and a comparator module 122. Data formatting module 120 receives the signal 102 representative of the output current of power module 40, and generates a digital word 124 which represents the power module's output current. Current sense information 102 is preferably received from power module 40 as a digital value; if in analog form, data formatting module 120 must include an analog-to-digital converter to digitize the information. As noted above, the bits of the digital word are coupled serially to share bus 50 via a bus driver 110 such as an NMOS FET.

Comparator module 122 has a first input 126 connectable to current share bus 50 which receives digital words representative of a power module's output current conveyed via the bus, and a second input 128 which receives data representing the output current of power module 12 from data formatting module 120. Note that signal 128 may be a one bit-wide serial data signal like that provided to bus driver 110, or a multi-bit digital word representing the output current of power module 12, with its bits delivered in parallel to comparator module 122. The comparator module compares the digital word received from the bus with the current value of the power module to which it is connected, and provides signal 106 to power module 40 so as to cause its output current to be adjusted to approximately match the current value represented by the digital word on the bus.

Figure 1A:
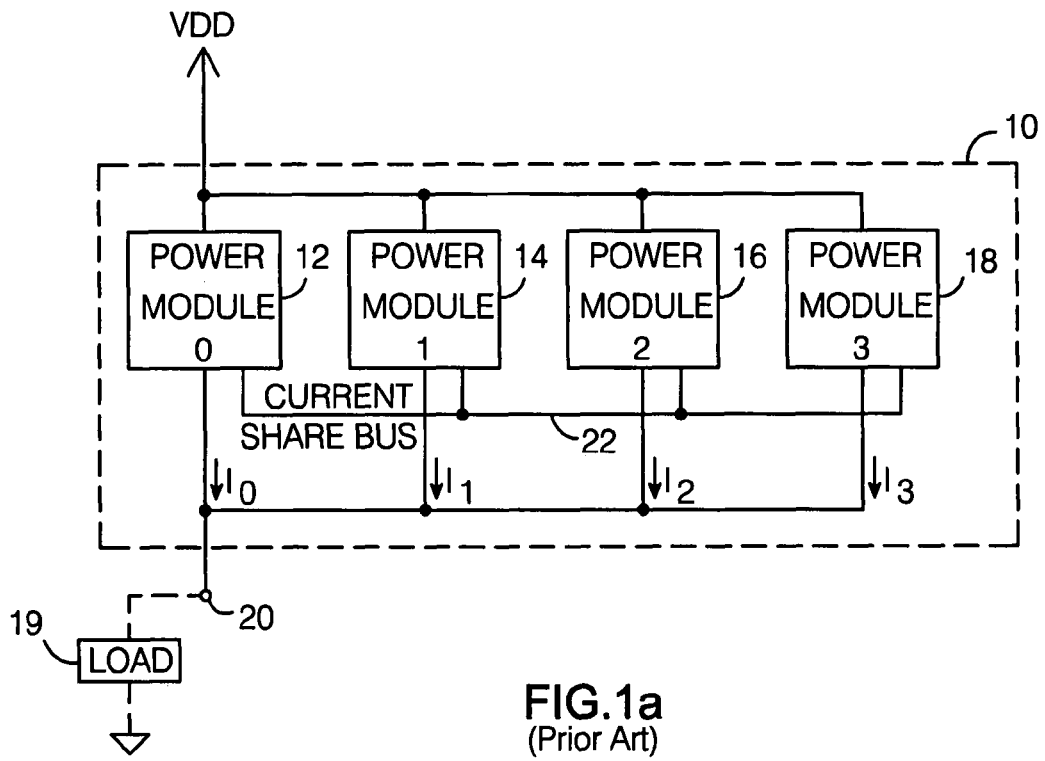
FIG. 1a is a block diagram of a known power system which includes a current share bus.
Figure 5:
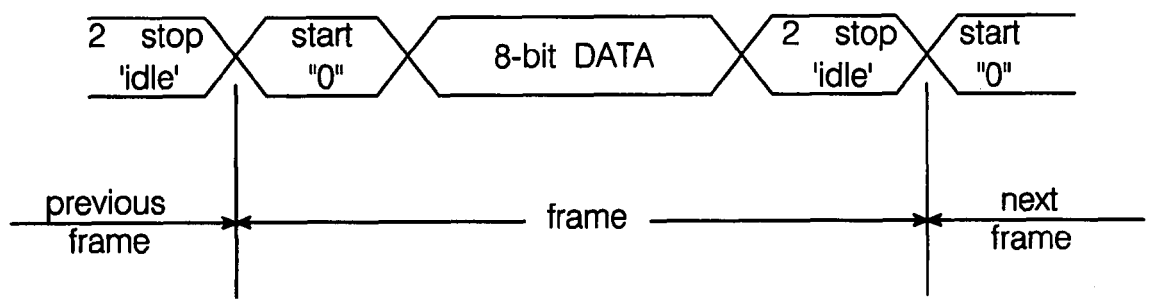
FIG. 5 is diagram of a digital word frame as might be conveyed on a current share bus by a digital current share bus interface per the present invention.
Figure 1B:
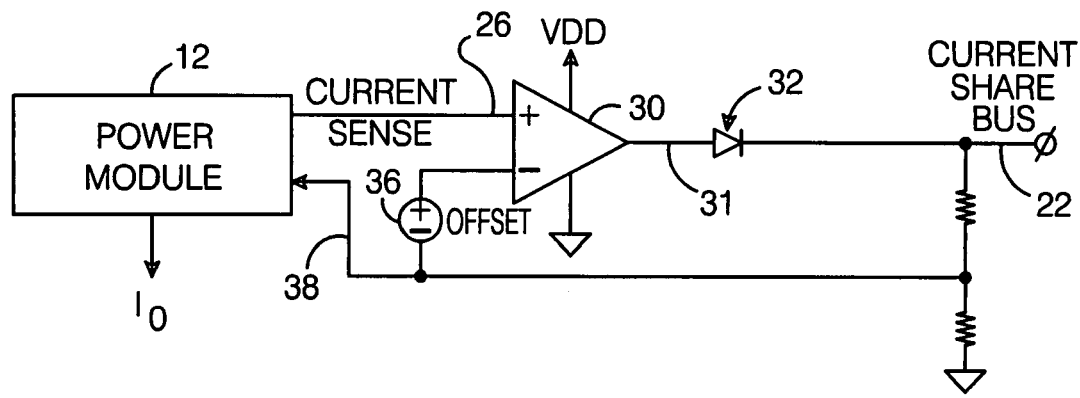

Digital words are preferably conveyed on the current share bus in the form of frames. Each frame preferably consists of at least one start bit, a plurality of data bits, and at least one stop bit. No addressing is required. An exemplary frame is shown in FIG. 5, which consists of one start bit, eight data bits, and two stop bits. The data bits represent the power module output current value to be conveyed via the current share bus. The start bit is preferably always a logic '0', and the two stop bits provide synchronization between multiple interface modules. In a typical application, $t_{bit}$ would be equal to 10 μs. Because there is no addressing, the frame is repeated continuously at a frequency of ~10 kHz.

One possible protocol for the bus requires that, at start-up, an interface can start writing to the bus when the bus has been idle for at least two bits. The first interface to detect "idle" will "pull down" the bus and begin the data frame, and all other interfaces will synchronize at this moment. After the first start bit, all interfaces synchronize to the device with the fastest clock.

The present digital current share bus is preferably arranged such that a power module and its associated interface can be hot-plugged onto the bus. The bus protocol is preferably arranged such that a hot-plugged device cannot write to the bus until it has detected two stop bits. If the interface currently writing to the bus is unplugged in the middle of the write action, then the bus becomes "idle". The first interface to detect the "idle" period then writes to the bus and the share process is re-established. During a hot-plug, the value on the share bus may be incorrect for one data frame.

Figure 6:
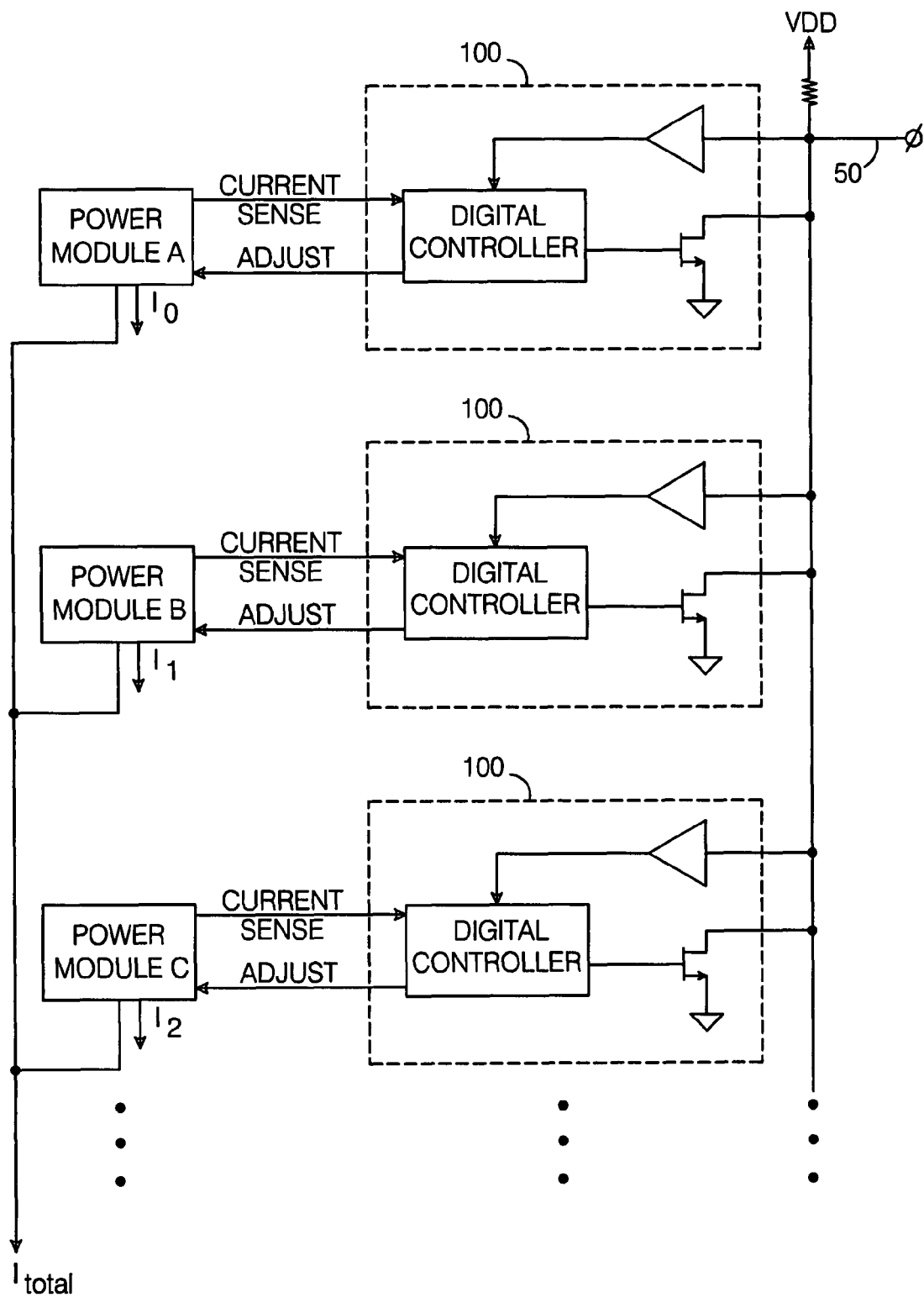
FIG. 6 is a block/schematic diagram of a multi-module power system in which each power module has an associated digital current share bus interface per the present invention.

A typical application is shown in FIG. 6. As noted above, a typical application would have multiple power modules (A, B and C) having their output currents ($I_0$, $I_1$, $I_2$) connected in parallel, and multiple interfaces 100 coupling respective power modules to current share bus 50. Each interface 100 receives current sense information from its respective module, attempts to convey it to bus 50, reads the output current value being conveyed via the bus, and causes its module's output current to be adjusted as needed to approximately match the value being conveyed.

In accordance with a typical bus protocol, the data each interface puts on the current share bus is a representation of the normalized output current provided by the power module to which it is coupled. The maximum and minimum data words are preferably 0XFF and 0X00, respectively. When an interface detects "contention"—i.e., an interface writes a '0' to the bus, but detects a '1'—it will immediately stop writing to the bus for the duration of the frame. In this way, the data on the bus is a representation of the normalized current of the power module providing the highest output current.

Figure 7C:
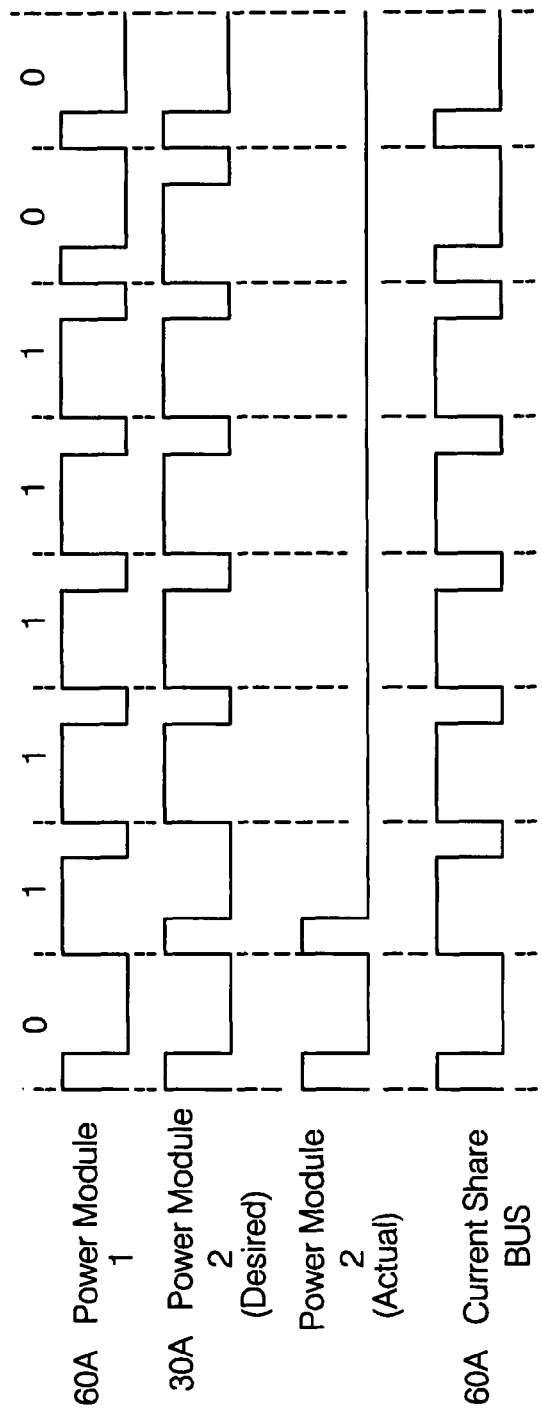

The method of operation described above is illustrated in FIGS. 7a-7d, which depict the operation of a power system which includes two power modules (Power Module 1 and Power Module 2) coupled to respective digital current share bus interfaces as described herein. In FIG. 7a, Power Module 1 is delivering current (90 A) and Power Module 2 has just been activated and is not yet delivering current (0 A). An interface per the present invention conveys a digital word representing the output current of Power Module 1 onto the current share bus, here with bit pattern 10111011. The "Power Module 2 (desired)" plot indicates the bit pattern that the interface connected to Power Module 2 would convey to the bus if it were in control of the bus. However, when writing a '0' to the bus, the interface for Power Module 2 detected a '1'; this contention causes the Power Module 2 interface to stop writing to the bus, as reflected by the "Power Module 2 (actual)" plot. Since Power Module 1 is in full control of the bus, the data pattern shown on the "Current Share Bus" plot is simply that of Power Module 1. The interface for Power Module 2 reacts to the contention by causing the output current of Power Module 1 to be increased.

In FIG. 7b, Power Module 2 has increased its contribution to the overall output current. In this example, Power Module 2 is providing 1 A, and Power Module 1 has reduced its contribution to 89 A. However, due to the unequal sharing, bus contention is again detected by Power Module 2 interface, such that the interface stops writing, as reflected in the "Power Module 2 (actual)" plot. The Power Module 2 interface also reacts by causing Power Module 2 to again increase its current contribution. As in FIG. 7a, the Current Share Bus plot is the same as the Power Module 1 plot.

In FIG. 7c, Power Module 2 has increased its current contribution to 30 A, and Power Module 1 has reduced its to 60 A. As a result, the first data bit conveyed to the bus by the Power Module 1 interface is a '0'. This allows the Power Module 2 interface to also write its first data bit (a '0') to the bus, as seen in the "Power Module 2 (actual)" plot. However, the next bits conveyed by the Power Module 1 and Power Module 2 interfaces are a '1' and a '0', respectively, causing the Power Module 2 interface to stop writing to the bus and to instruct its module to again increase its current contribution. The Power Module 1 interface still controls the bus, and thus the Current Share Bus plot is the same as the Power Module 1 plot.

Figure 7D:
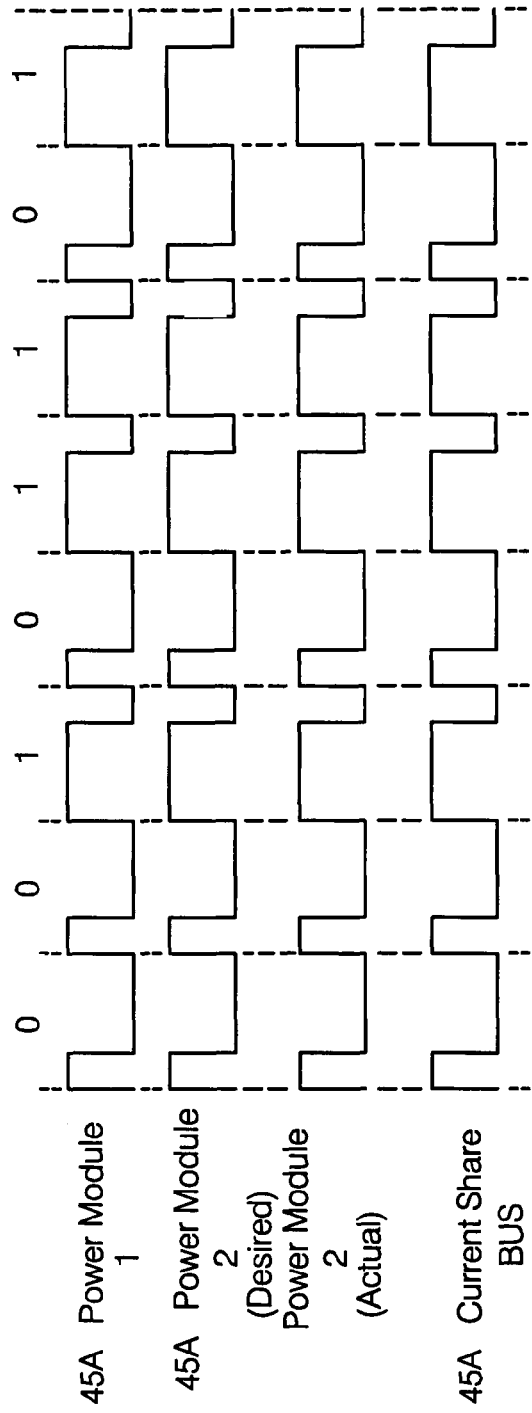

In FIG. 7d, Power Module 2 has increased its current contribution to equal that of Power Module 1. As such, their respective interfaces output identical bit patterns to the bus, there is no contention, and the Current Share Bus plot is the same as both the Power Module 1 and Power Module 2 plots.

A digital current share bus interface as described herein can be arranged to prevent "hunting" or oscillation between power modules. This can be accomplished, for example, by requiring an interface conveying a digital word that is within 2 LSBs of the interface controlling the bus to stop increasing its module's output current.

A system as described herein can also be arranged to provide fault immunity. For example, if the current share bus becomes shorted, the individual power modules continue to function.

The present digital share bus interface also provides improved accuracy with respect to the equality of the current contributions from respective power modules. Prior art analog current share busses would typically employ an offset voltage to avoid "hunting", which inherently resulted in an error on the order of 50 mV/2V=2.5%. In contrast, when the present interface is arranged to stop increasing its module's output current when it is within 2 LSBs of the controlling interface, its error is on the order of $2/256$=0.8%. In addition, the use of the present digital approach also enables accurate tracking between power modules at lower load levels than prior art analog schemes.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A digital current share bus interface, comprising:
   a digital controller arranged to provide an interface between a first power module and a current share bus, said first power module arranged to provide an output signal representative of its output current and to adjust its output current in response to a signal received at a control input, said digital controller comprising:
   a data formatting module which receives said output signal representative of said first power module's output current and generates a first digital word which represents said first power module's output current, the bits of said digital word coupled to said bus; and
   a comparator module having a first input connectable to a current share bus for receiving a second digital word which represents the output current of a power module coupled to said bus, and a second input which receives a digital signal representative of said first power module's output current from said data formatting module,
   said comparator module arranged to provide said signal to the control input of said first power module so as to adjust said first power module's output current to approximately match the current value represented by said second digital word.

2. The interface of claim 1, wherein said bus is coupled to a fixed positive voltage such that it is nominally at a 'high' logic level, further comprising a bus driver which is turned on and off in response to the bits of said first digital word generated by said data formatting module and which is connected to said bus at an output, said bus driver pulling the logic level on said bus toward a 'low' logic level when turned on.

3. The interface of claim 2, wherein said bus driver is a transistor having its control input connected to receive the bits of said first digital word generated by said data formatting module and its current circuit connected between said bus and a circuit common point.

4. The interface of claim 3, wherein said transistor is an NMOS FET, the drain of which is connected to said bus.

5. The interface of claim 1, wherein said data formatting module is arranged such that a clock for said bus is modulated onto the data conveyed on said bus.

6. The interface of claim 5, wherein said interface is arranged such that each data bit has a duration of $t_{bit}$, a '1' is defined as a low-to-high transition at the start of said bit and a high-to-low transition at approximately 75% of $t_{bit}$, and a '0' is defined as a low-to-high transition at the start of said bit and a high-to-low transition at approximately 25% of $t_{bit}$.

7. The interface of claim 6, wherein said data bits are coupled to said bus via a bus driver which receives said data bits at an input, inverts them, and delivers said inverted data bits to said bus, such that a '1' on said bus is defined as a high-to-low transition at the start of said bit and a low-to-high transition at approximately 75% of $t_{bit}$, and a '0' is defined as a high-to-low transition at the start of said bit and a low-to-high transition at approximately 25% of $t_{bit}$.

8. The interface of claim 1, wherein said digital words are arranged as digital frames, each of said frames comprising:
    at least one start bit;
    a plurality of data bits; and
    at least one stop bit.

9. The interface of claim 8, wherein each of said frames comprises:
    one start bit;
    eight data bits; and
    two stop bits.

10. The interface of claim 1, wherein said output signal representative of said first power module's output current is a digital signal.

11. The interface of claim 1, wherein multiple power modules are coupled to said share bus via respective ones of said interfaces, the output currents of said power modules connected in parallel, said interfaces arranged such that said second digital word represents the value of the output current provided by the power module providing the highest output current.

12. The interface of claim 11, wherein a given interface's data formatting module is arranged to stop conveying data bits to said bus if said given interface's comparator module detects that another interface is conveying a digital word via said bus which represents an output current that is greater than that provided by the power module coupled to said given interface.

13. The interface of claim 12, wherein a given interface's data formatting module is arranged to stop conveying data bits to said bus if said interface's comparator module detects that another interface has conveyed a logic '1' via said bus.

14. The interface of claim 1, wherein said interface is arranged such that it can be hot-plugged onto said current share bus.

15. The interface of claim 14, wherein said digital words are arranged as digital frames, each of said frames comprising:
    at least one start bit;
    a plurality of data bits; and
    at least one stop bit;
    wherein said interface is arranged such that, if hot-plugged onto said bus, said interface does not attempt to convey data bits onto said bus until its comparator module has detected said at least one stop bit on said bus.

16. The interface of claim 1, further comprising a current share bus to which said interface is coupled, said current share bus comprising a single wire such that data bits are conveyed on said bus as a serial bit stream.

17. The interface of claim 1, wherein said interface is arranged to provide said control signal to said power module such that said power module's output current is not adjusted if the difference between said first and second digital words is less than a predetermined value.

18. The interface of claim 17, wherein said data words have a maximum value of 0XFF and a minimum value of 0X00, said interface arranged such that said power module's output current is not adjusted if the difference between said first and second digital words is less than 2 LSBs.

19. The interface of claim 1, wherein the bits of said first digital word are coupled to said bus serially.

20. A digital current share bus system, comprising:
    a plurality of power modules which provide respective output currents, each of said power modules arranged to provide an output signal representative of its output current and to adjust its output current in response to a signal received at a control input;
    a current share bus; and
    a plurality of digital current share bus interfaces, each of which provides an interface between a respective one of said power modules and said current share bus, each interface comprising a digital controller which includes:
        a data formatting module which receives the output signal representative of output current from the interface's associated power module and generates a digital word which represents said power module's output current, the bits of said digital word coupled serially to said bus; and
        a comparator module having a first input connected to said current share bus and which receives digital words conveyed onto said bus by said interfaces, and a second input which receives a digital signal representative of said first power module's output current from said data formatting module,
    said comparator module arranged to provide said signal to the control input of said associated power module so as to adjust said power module's output current to match the current value represented by the digital word most recently received from said bus.

21. The interface of claim 20, wherein a given interface's data formatting module is arranged to stop conveying data bits to said bus if said interface's comparator module detects that another interface is conveying a digital word via said bus which represents an output current that is greater than that provided by the power module coupled to said given interface.

22. The interface of claim 21, wherein a given interface's data formatting module is arranged to stop conveying data bits to said bus if said interface's comparator module detects that another interface has conveyed a logic '1' via said bus.

* * * * *